May 9, 1933.  C. ZORZI  1,908,620

ELECTRICAL MACHINE

Filed March 7, 1931   2 Sheets-Sheet 1

INVENTOR
CARLO ZORZI.
BY
ATTORNEY.

May 9, 1933.  C. ZORZI  1,908,620
ELECTRICAL MACHINE
Filed March 7, 1931  2 Sheets-Sheet 2

INVENTOR
CARLO ZORZI.
BY
ATTORNEY

Patented May 9, 1933

1,908,620

UNITED STATES PATENT OFFICE

CARLO ZORZI, OF MILAN, ITALY

ELECTRICAL MACHINE

Application filed March 7, 1931. Serial No. 520,935.

This invention relates to an electrical machine which may be used as a generator, a motor, or a motor generator, and is a continuation in part of application Serial Number 443,604, filed April 11, 1930.

The invention has for its object an improved construction which permits the easy removal of the windings from the machine without disturbing the rotor thereof.

Another object it to provide an interiorly smooth rotor housing which may completely enclose and protect the rotor.

A further object is to provide an improved form of sleeve between the stator and rotor.

Other objects will be apparent from the following description, where for the sake of illustration, an electric motor is described.

It will be understood that the term "rotor" is used to denote either a rotor as commonly used with machines for alternating current, or a wound armature as used with direct current and that the term "stator" is used to denote any suitable form of construction for either alternating or direct current.

Figure 1:
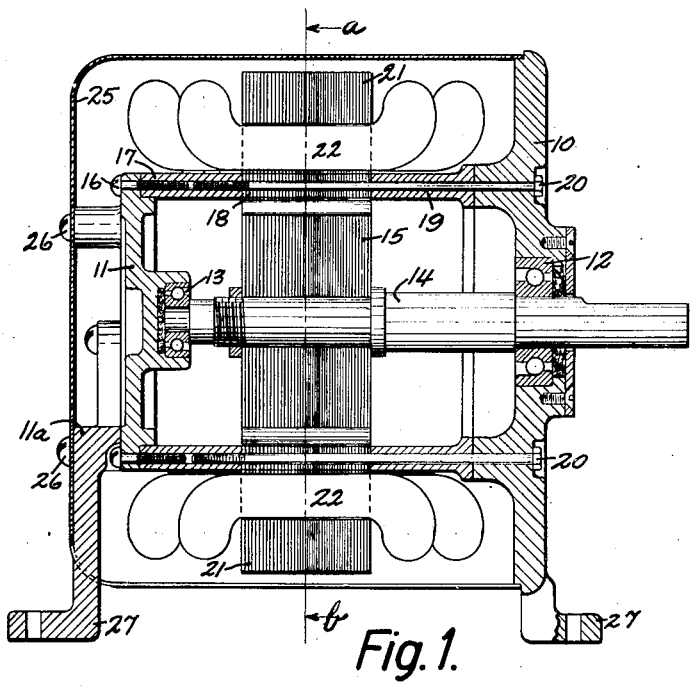
Figure 1 is a vertical longitudinal sectional view of a motor embodying this invention.
Figure 3:
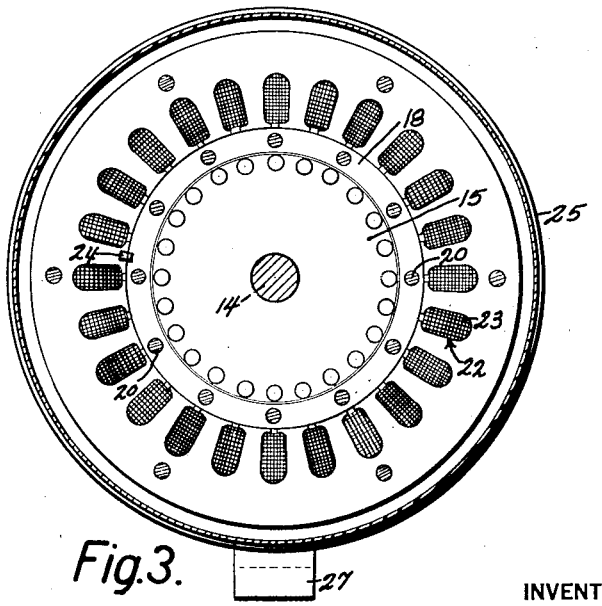
Figure 3 is a sectional view on the line a—b, Figure 1.

The numeral 10 denotes the front end plate of the motor and 11 the rear end plate. In these plates are formed or supported suitable bearings 12, 13, (13 may be omitted and the shaft supported in a single bearing in 12), supporting the rotor shaft 14 which may extend outwardly beyond plate 10 as shown. Secured to shaft 14, is a group of laminations 15 forming the rotor and these may be provided with suitable windings.

The end plate 13 is secured by screws 16 to a non-magnetic ring 17 which is in turn secured to a group of laminations 18 and to another non-magnetic ring 19.

Figure 4:
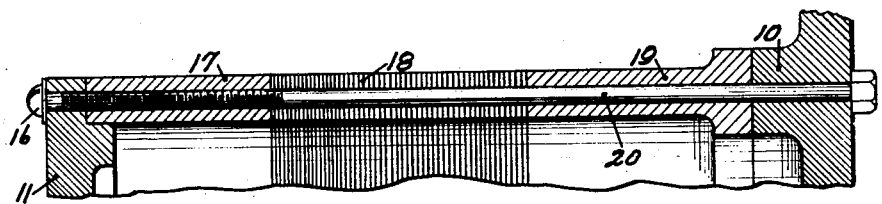
Figure 4 shows details of construction of the rotor sleeve.

The parts 17, 18, 19 and the screws 20, (preferably non-magnetic) constitute a rotor housing or sleeve as shown in Figure 4 which encloses the rotor in a chamber sealed from the atmosphere except where the shaft 14 passes through end plate 10.

Figure 5:
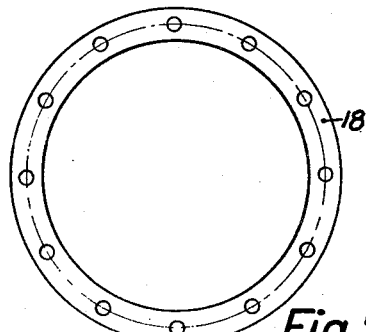
Figure 5 shows one of the sleeve laminations 18.

The sleeve laminations 18 are annular as shown in Figure 5 and form an annulose section. They are securely clamped to the rings 17 and 19 by bolts 20, (preferably non-magnetic) which enter the end plate 10. This forms a rotor sleeve. The interior surfaces of the sleeve may be ground to size, thereby easily obtaining a small accurate air gap between the rotor laminations 15 and the inner surface of laminations 18.

The outer surface of the sleeve, (particularly the annulose laminated section) may also be ground to size so as to obtain a close fit for the stator laminations 21 carrying stator windings 22 placed in slots 23.

The stator assembly can be easily removed or replaced by sliding it off the rotor sleeve and there is no air gap between the sleeve and stator laminations. If necessary a key 24 can be used to locate the stator in position.

To protect the stator a ventilated shield 25 is placed over it and secured in place by screws 26.

Feet 27 are provided on one or both end plates for supporting the motor, but the machine may be mounted in any suitable manner with its shaft either horizontal or vertical.

Figure 2:
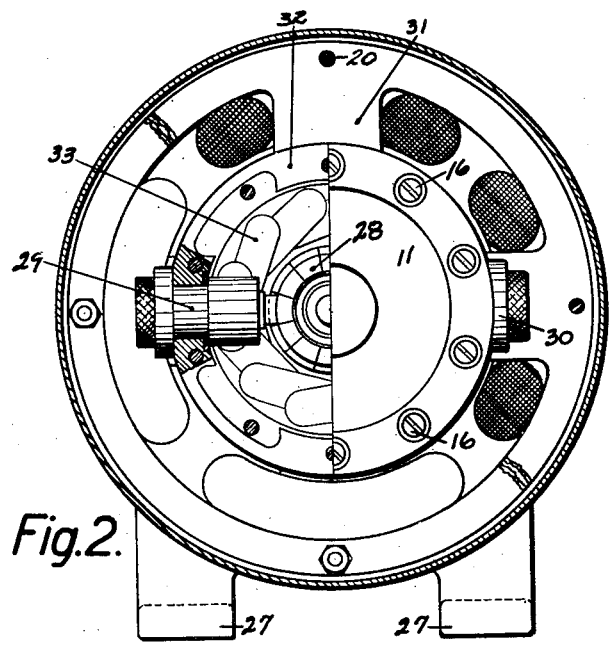
Figure 2 is a view of the commutator end of the motor of Figure 1 arranged for direct current.

Figure 2 shows a rotor or armature for a direct current machine. Here the commutator 28 is enclosed by the rotor sleeve, the usual brushes 29, 30 being insulatedly supported in ring 17. Obviously the commutator 28 may be a collector ring or rings, and where centrifugal starting switches are used, the commutator may be replaced by such a switch and the current lead in and out to the same by brushes as shown.

In connection with direct current machines the laminations in the rotor or armature, and the sleeve and the stator or field can be toothed in the usual manner. In Figure 2 the projecting teeth of the field are shown at 31. These contact in proper relation to the teeth 32 in the sleeve laminations 18. The armature has the usual winding shown at 33 and may be of any suitable type.

The use of an annulose section of laminations in the sleeve between stator and rotor eliminates the difficulties in manufacture heretofore met with where it has been attempted to cast or insert pieces of magnetic material in a non-magnetic sleeve or casing. With such structures having inserts, it is difficult and expensive to grind the internal bore and the use of the annulose section herein disclosed is a distinct improvement in this respect.

What is claimed is:

1. In an electric machine, end plates, a shaft supported thereby, a rotor on said shaft, a fixed sleeve about said rotor comprised in part of annular laminations, and a stator having laminations supported by said first laminations.

2. In an electric machine, an end plate, a shaft therein, a rotor on said shaft, a fixed sleeve comprised in part of annular laminations surrounding said rotor, an end plate secured to said sleeve and a stator having laminations supported by said first laminations.

3. In an electric machine, a stationary rotor sleeve comprised of non-magnetic annular rings and annular laminations secured between said rings and presenting a smooth internal bore for a rotor to operate therein.

4. In an electric machine, a stationary rotor sleeve comprised of nonmagnetic rings, a group of laminations secured between said rings, and end plates secured to the ends of said sleeve.

5. The combination as claimed in claim 4 wherein the end plates form bearing supports.

6. In an electric machine, the combination with a fixed rotor sleeve having annular lamination rings therein presenting a smooth exterior bore, of a stator having laminations presenting a smooth interior bore adapted to fit over said first laminations.

7. The combination as claimed in claim 6 wherein the stator and fixed sleeve are provided with means for preventing relative turning movement.

8. In an electrical machine, a fixed rotor sleeve comprising annular non-magnetic rings, a group of annular rings of magnetic material, an end plate, means for securing all said rings to said plate with said magnetic rings between said non-magnetic rings, and an end plate secured to the open end of said sleeve.

9. The combination as claimed in claim 8 wherein the means for securing the rings together comprises non-magnetic bolts.

10. In an electrical machine, a stationary rotor sleeve comprised in part of a plurality of relatively thin laminations of annular form presenting smooth continuous inner and outer surfaces over a portion of said sleeve.

11. In an electrical machine having end plates, a fixed rotor sleeve extending between said end plates comprised in part of a plurality of relatively thin laminations of annular form presenting smooth continuous inner and outer surfaces over a portion of said sleeve.

12. In an electrical machine having end plates, a fixed rotor sleeve extending between said end plates comprised in part of a plurality of relatively thin laminations of annular form presenting smooth continuous inner and outer surfaces over a portion of said sleeve, a rotor in said sleeve, a shaft for said rotor and a stator supported on said sleeve and in contact with said laminations.

13. In an electric machine having a stator and rotor, a stationary sleeve between said stator and rotor having an annulose section of laminations.

14. In an electrical machine having an armature and field, a fixed sleeve between said armature and field having a section composed of a plurality of laminations having inwardly projecting teeth adapted to cooperate with the poles of said armature, and contact members insulatedly supported on said sleeve.

15. In an electrical machine having a stator and rotor, a fixed sleeve between said stator and rotor having a section composed of laminations and contact members insulatedly supported on said sleeve and adapted to contact with a winding on said rotor.

In testimony whereof I affix my signature.

CARLO ZORZI.